United States Patent [19]

Krichever et al.

[11] Patent Number: 4,808,804
[45] Date of Patent: Feb. 28, 1989

[54] BAR CODE SYMBOL READERS WITH VARIABLE SPOT SIZE AND/OR WORKING DISTANCE

[75] Inventors: Mark J. Krichever, Hauppauge; Boris Metlitsky, Stony Brook; Jerome Swartz, Setauket, all of N.Y.

[73] Assignee: Symbol Technologies, Inc., Bohemia, N.Y.

[21] Appl. No.: 7,775

[22] Filed: Jan. 28, 1987

[51] Int. Cl.$^4$ ............................................. G06K 7/10
[52] U.S. Cl. ................................... 235/462; 235/454; 235/470; 350/3.76; 350/61
[58] Field of Search ............ 350/3.71, 6.1, 6.2, 350/6.5, 6.6, 6.7, 6.8; 235/454, 457, 462, 463, 467–470, 472

[56] References Cited

U.S. PATENT DOCUMENTS

| | | | |
|---|---|---|---|
| 3,928,759 | 12/1975 | Sansone | 235/467 |
| 3,995,166 | 11/1976 | Hobart et al. | 235/467 |
| 4,333,006 | 6/1982 | Gorin et al. | 235/457 |
| 4,414,468 | 11/1983 | Laurer et al. | 235/463 |
| 4,560,862 | 12/1985 | Eastman et al. | 235/467 |
| 4,575,625 | 3/1986 | Knowles | 350/6.5 |

*Primary Examiner*—A. D. Pellinen
*Assistant Examiner*—Jeffrey A. Gaffin
*Attorney, Agent, or Firm*—Kirschstein, Kirschstein, Ottinger & Israel

[57] ABSTRACT

Systems for changing the working distance and/or the beam spot size of an outgoing laser beam scanned across symbols to be read by a bar code symbol reader use different optical assemblies, or a single optical assembly having changeable light-transmissive portions of a plate, or changeable pupils, or a movable laser light source.

22 Claims, 5 Drawing Sheets

BAR CODE SYMBOL READERS WITH VARIABLE SPOT SIZE AND/OR WORKING DISTANCE

BACKGROUND OF THE INVENTION

1. Field of the Invention

This invention generally relates to laser scanning systems for reading bar code symbols and, more particularly, to various optical systems for changing the working distance and/or the reading spot size of an outgoing laser beam scanned across the symbols to be read. This invention also relates to systems for turning oval-shaped outgoing laser beams.

2. Description of the Related Art

Laser scanning systems and components of the type exemplified by U.S. Pat. Nos. 4,251,798; 4,360,798; 4,369,361; 4,387,297; 4,593,186; 4,496,831; 4,409,470; 4,673,805; 4,758,717; 4,760,248; 4,736,095; 4,460,120 and 4,607,156—all of said patents being owned by the assignee of the instant invention and being incorporated by reference herein—have generally been designed to read bar code symbols, particularly of the Universal Product Code (UPC) type, at a certain working or reading distance from a hand-held or stationary scanner, and with a reading spot of a certain size. The particular spot size and working distance are typically optimized in dependence upon the particular application and, in effect, the system tends to be custom-made for each intended use.

For example, UPC symbols are typically affixed on objects in at least three different densities or sizes, depending to a great extent on the size of the object itself. So-called "high-density" (HI-D) symbols are typically characterized by very thin bars separated by very thin spaces and, hence, are typically affixed to small objects. So-called "low-density" (LO-D) symbols are generally characterized by very broad bars separated by very broad spaces and, hence, are typically affixed to large objects. So-called "medium-density" (MED-D) symbols are generally characterized by bars and spaces whose respective widths along the scanning direction lie somewhere between those of HI-D and LO-D symbols, and are affixed to medium-sized objects. The definitions of HI-D, LO-D and MED-D symbols in terms of numerical values may be different for different applications, bu for any one particular application, e.g. the inventorying and check-out of supermarket goods, these relative definitions and their numerical values are readily understood by those skilled in the art.

To read HI-D symbols with accuracy, a very fine reading spot, e.g. a six mil diameter circular spot, is desired. The known optical systems for forming such a very fine spot produce a very highly divergent laser beam and, as a result, the working distance is correspondingly very short. To read LO-D symbols with accuracy, a very large reading spot, e.g. a forty mil diameter circular spot, is desired. The known optical systems for forming such a very large spot produce a laser beam with very low divergence and, as a result, the working distance is correspondingly very long.

Hence, it will be appreciated that no single known laser scanning system can read both LO-D and HI-D symbols, because the known optical systems designed to read LO-D symbols cannot read HI-D symbols, and vice versa. An optical system designed to read LO-D symbols will have a very long working distance—which is very desirable to read close-in and far-out symbols—but the very large spot size will simultaneously overlap at least one bar and its adjacent space, thereby obscuring a HI-D symbol. On the other hand, an optical system designed to read HI-D symbols has a very short working distance which is very disadvantageous to read far-out symbols. It would be desirable to combine the very long working distance characteristic of LO-D reading systems with the very fine spot size characteristic of HI-D reading systems in a single instrument.

SUMMARY OF THE INVENTION

1. Objects of the Invention

It is a general object of this invention to advance the state of the art of laser scanning systems for reading bar code symbols.

It is another object to combine the best features of HI-D and LO-D reading systems in a single instrument.

Another object of the invention is to provide a hand-held scanner having the capability of reading both LO-D symbols and HI-D symbols.

An additional object of the invention is to read either LO-D symbols alone, or HI-D symbols alone, at an increased range of working distance.

A further object of the invention is to read far-out LO-D symbols with a larger reading spot, and to read close-in HI-D symbols with a smaller reading spot, with the same instrument.

Yet another object of the invention is to change the reading spot size and/or the working distance of an outgoing laser beam during scanning, and preferably during each scan of a symbol, or after each scan.

Still another object of the invention is to simultaneously change the reading spot size and/or the working distance of an outgoing laser beam during scanning.

2. Features of the Invention

In keeping with these objects, and others which will become apparent hereinafter, one feature of this invention resides, briefly stated, in an optical arrangement for use in a laser scanning system for reading symbols, particularly bar code symbols having alternate bars and spaces arranged in a pattern which, when decoded, identify an object on which the symbol is affixed. The scanning system comprises a housing having an exit port, a laser source, e.g. a gas laser tube or a semiconductor laser diode, for generating a laser beam, and scanning means in the housing for scanning the laser beam in scans across successive symbols located exteriorly of the housing. The optical arrangement comprises optical means in the housing for directing the scanning beam along an optical path through the exit port, and for optically forming the scanning beam with a cross-sectional beam spot of a predetermined waist size and at a predetermined distance from the exit port of the housing.

In accordance with one feature of this invention, the optical means includes means for changing the predetermined waist size of the beam spot during scanning. This feature enables the scanning system to read LO-D and HI-D symbols. It is further advantageous if the changing means is operative for changing the predetermined distance of the beam spot during scanning, and preferably simultaneously with the changing of the waist size. This so-called "zoom" feature enables the scanning system to read close-in and far-out symbols.

In a first advantageous embodiment of the optical arrangement, the optical means includes a first optical sub-assembly for directing the scanning beam through the exit port during a part of each scan, and for optically forming the scanning beam with a beam spot of a predetermined first waist size and at a predetermined first distance, as well as a second optical assembly which directs the scanning beam through the exit port during another part of each scan and optically forms the scanning beam with a beam spot of a predetermined second waist size and at a predetermined second distance from the exit port.

In one modification of this invention, the first and second optical sub-assemblies form their respective beam spots of the same waist size bu at different predetermined distances. This feature increases the range at which symbols of the same predetermined density can be read. Thus, LO-D symbols can be read with a large spot size both close-in and far-out from the housing. Similarly, HI-D symbols can be read with a fine spot size for both close-in and far-out symbols. Thus, the invention has an increased working distance range.

In another modification, the first and second optical sub-assemblies form their respective beam spots of different predetermined waist sizes and at different predetermined distances. This feature advantageously enables the system to read symbols of one density to be read at close range and symbols of another density to be read at far range. For example, LO-D symbols having a larger spot size can be read at far range, while HI-D symbols having a finer spot size can be read at close range—all in the same instrument without sacrificing reading accuracy for either HI-D or LO-D symbols. In effect, the best features of optical spot forming systems for both HI-D and LO-D symbols have been integrated in the same instrument.

Another advantageous feature in connection with the use of two optical sub-assemblies is related to automatic gain control. Close-in symbols, due to their proximity to the scanner, have a higher signal-to-noise ratio than far-out symbols. It would be advantageous to reduce the amplitude of laser light reflected off close-in symbols for detection by photosensor means in the housing while, at the same time, increasing the amplitude of the laser light reflected from far-out symbols. This may advantageously be accomplished by the use of a common beam splitter shared by both sub-assemblies. The beam splitter may be designed to send a larger fraction of the laser beam emitted by the laser source to one optical assembly, and a smaller fraction to the other optical sub-assembly. Thus, the optical assembly which is to be used for forming a beam spot at a relatively further distance from the exit port will be provided with the higher fraction of the laser beam.

Another optical arrangement for changing the waist size of the beam spot and/or the working distance thereof comprises the use of a focusing means having a high magnification factor, e.g. on the order of twenty, an entrance pupil, and a light-transmissive plate having plate portions of different optical distance characteristics. The changing means is operative for moving the plate between a close position in which one plate portion is positioned adjacent the entrance pupil to enable close-in symbols to be read, and a far position in which another plate portion is positioned adjacent the entrance pupil to enable far-out symbols to be read. The different optical distance characteristics move the beam spot through a working distance which is proportional to the square of the magnification factor.

In another modification, the changing means is operative for changing the size of the pupil which, in turn, changes the waist size of the beam spot. The change of the working distance and the change of the beam spot waist size can be independently controlled, or can be simultaneously controlled by the use of a single optical component.

In still another optical arrangement of this invention, which is of particular benefit when the laser source is embodied by a diode, the change in working distance may advantageously be effected by moving the diode in a reciprocal manner upstream and downstream of the optical path along which the outgoing laser beam is directed. An electrically-controlled position transducer is mounted in the housing, and the laser diode is mounted on the transducer. A high magnification factor focusing means is mounted downstream of the diode. When the diode is moved back and forth over a small distance, this motion is translated by the square of the magnification factor to generate a zoom-acting system in which the working distance is continuously increased and decreased.

Yet another way of changing the waist size of the beam spot is to use an electrical circuit operative for changing the waist size of the spot by changing the electrical characteristics of the electrical circuit which senses the light of variable intensity reflected from the symbols to be read, and which processes the sensed light into data descriptive of the symbols.

The beam spot of the laser beam emitted by a gas laser generally has a circular cross-section, whereas, by contrast, the cross-section of the beam spot of the laser beam emitted by a laser diode is generally non-circular and, in fact, is oval in shape. In this case, it will be recognized that: the oval spot has a longer and a shorter waist dimension in two mutually perpendicular directions. This can be used to advantage to read both HI-D and LO-D symbols by turning the scanning beam between a low density and a high density orientation. In the low density orientation, the longer waist dimension of the spot is positioned to extend along the scanning direction and is used for reading LO-D symbols since the spot has an "effective" larger size. In the high density orientation, the shorter waist dimension of the spot extends along the scanning direction for reading HI-D symbols since the spot has an "effective" smaller size. The turning of the scanning beam may advantageously be combined with means for changing the working distance of the beam spot during scanning so that the beam spot can be not only turned, but also zoomed.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1A:
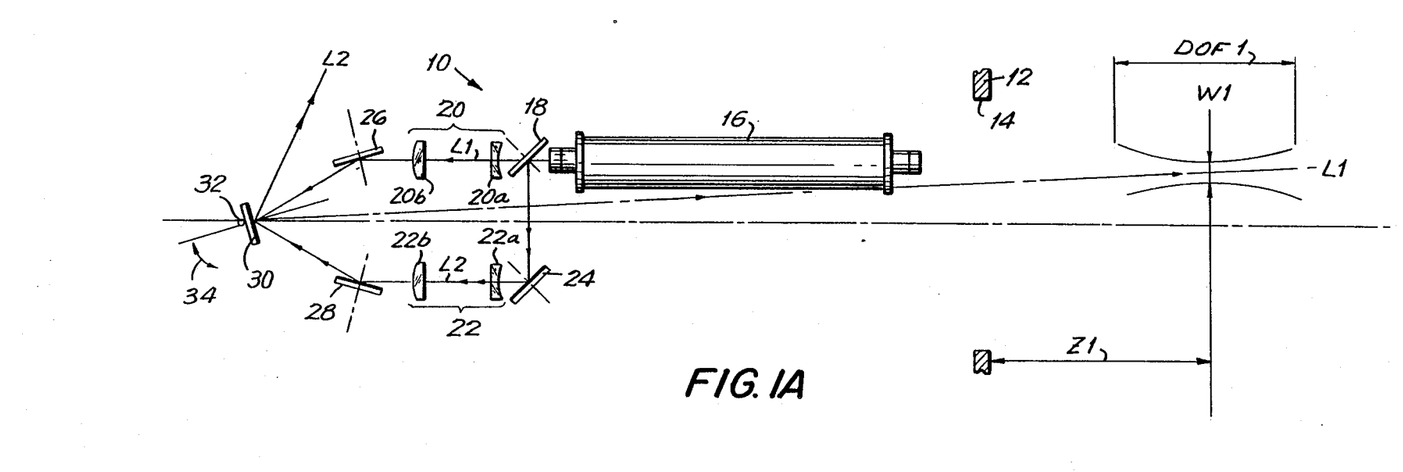
FIG. 1A is a diagrammatic view of an optical system operative for changing the reading range and/or the reading spot size during one stage of scanning in a laser scanning system in accordance with this invention.
Figure 1B:
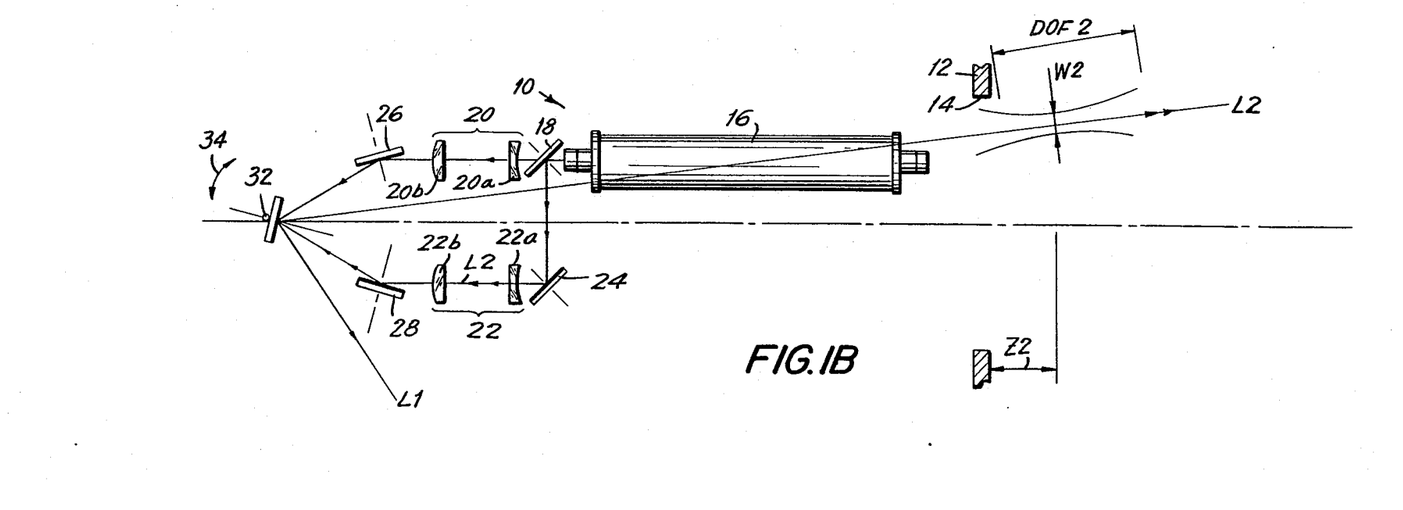
FIG. 1B is a view analogous to FIG. 1A, but at another stage of scanning.

Referring now to the drawings, reference numeral 10 in FIGS. 1A and 1B generally identifies an optical arrangement in a laser scanning system of the type generally described in the above-identified patents, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters.

The arrangement 10 includes a housing 12, shown in broken-away view, and intended to represent either hand-held, desk-top workstation, or stationary scanner, housings having an exit port 14 through which an outgoing laser light beam is directed to impinge on, and to be scanned across, symbols located exteriorly of the housing, each symbol to be scanned and read in its respective turn. A laser source, e.g. a gas laser tube 16 or a semiconductor laser diode, is mounted in the housing and, when energized, the source 16 generates a laser beam.

The arrangement 10 also includes a transmitter means, e.g. a beam splitter 18 operative for transmitting a first fractional magnitude of the laser beam emitted by source 16 through the splitter and to a first assembly 20, and for transmitting a second fractional magnitude of the laser beam emitted by source 16 by reflection from the splitter and to a second optical assembly 22. For ease of understanding the drawings, the first fractional magnitude has been designated by reference character L1, and its optical path is shown by single-headed arrows. The second fractional magnitude has been designated by reference character L2, and its optical path is shown by twin-headed arrows. Although the fractional magnitudes could be equal to one-half each, there are circumstances, as explained below, in which the fractional amplitudes could and will be different.

Each optical assembly 20, 22 includes a beam expanding negative lens 20a, 22a, respectively, and an objective positive lens 20b, 22b, respectively. The optical assemblies are operative to optically modify the fractional beams L1, L2 to be focused at predetermined working or reading distances Z1, Z2, respectively, outside the housing, and with reading beam spots, preferably, but not necessarily, of circular cross-section, having predetermined waist sizes w1, w2, respectively.

Folding mirror 24 directs the fractional beam L2 reflected from the splitter 18 to the second optical assembly 22. Additional folding mirrors 26, 28 direct the L1, L2 beams, after respective passage through assemblies 20, 22, to a scanning mirror 30 for reflection therefrom. As described in detail in U.S. Pat. No. 4,496,831, the scanning mirror 30 is mounted on an output shaft 32 of a scanning motor which is operative to reciprocally turn the scanning mirror 30 in opposite circumferential directions, as indicated by curved twin-headed arrow 34, through a limited angular extent in order to direct any laser beam impinging thereon to be reflected therefrom and moved along repetitive linear sweeps. In a preferred embodiment, as many as forty linear sweeps per second may be generated.

The reflected beams L1, L2 reflected off the scanning mirror 30 may or may not be directed through the exit port 14 and, in fact, in the preferred embodiment, the beams L1, L2 take turns exiting the housing during each scan. Thus, as shown in FIG. 1, during a part of each scan, after beam L1 has passed through optical assembly 20 and reflected off folding mirror 26, the scanning mirror 30 directs beam L1 out through the exit port 14 where the beam L1 is focused with a spot size w1 at a distance Z1 from the housing. At the same time, the beam L2 is directed by the scanning mirror 30 into the interior of the housing where the beam L2 is permitted to harmlessly "bounce around".

As shown in FIG. 2, during another part of each scan, after beam L2 has passed through optical assembly 22 and reflected off folding mirror 28, the scanning mirror 30 directs beam L2 out through the exit port where the beam L2 is focused with spot size w2 at a distance Z2 from the housing. At the same time, the beam L1 is directed by the scanning mirror 30 into the interior of the housing where it is allowed to harmlessly "bounce around". It will thus be seen that during each sweep of the scanning mirror, both beams L1 and L2 exit the housing, albeit at different times.

In the event that a symbol is located at such predetermined distances Z1 or Z2, or anywhere within the respective depth of fields DOF1, DOF2 of the beams L1, L2, then the respective beam will repetitively sweep across the symbol until the system successfully decodes the symbol. Although the cross-sectional size of the beam spot varies within the depth of field, the symbol can nevertheless be successfully decoded and read so long as it is located within the respective depth of field.

In accordance with this invention, provision of an auxiliary optical assembly and a beam splitter shared by the two optical assemblies enables the system to be designed to be much more versatile than heretofore. For example, the first and second optical assemblies 20, 22 may be designed to form their respective beam spots with the same waist size, i.e. w1=w2, but at different distances, e.g. Z1>Z2. By way of non-limiting numerical example, assembly 22 can be designed as described in U.S. Pat. No. 4,409,470 to have a fine spot size w2=6 mils suitable for reading HI-D symbols, at a working distance Z2 equal to 3.5", and a DOF2 ranging from 1" up to 5" relative to the exit port 14 of the housing; the other optical assembly 20 can be designed to have the same spot size w2 equal to 6 mils, but at a working distance Z1 of 7.5" and a DOF1 which ranges from 4" up to 11". In this example, a HI-D scanning system has been provided which can read symbols anywhere from 1" up to 11"—a much more increased range than if an auxiliary optical assembly were not employed. It is not necessary that DOF1 and DOF2 overlap each other. Indeed, in some applications, it may be desired that they do not so overlap. It does not matter to the system whether the symbol is read by the L1 or L2 beam. The system itself detects when a successful decode has occurred.

By the same analysis, both optical assemblies 20, 22 can be designed to form spot sizes on the order of 40 mils and at different distances from the housing, for reading LO-D symbols at an increased range by employing the L1 beam to read symbols at close range and the L2 beam for reading symbols at far range. Again, there need not be any overlap between the depth of fields of the beams.

In another variation, the optical assemblies could also be designed to form beam spots of different waist sizes, at different or at the same predetermined distances. In many applications, it typically happens that LO-D symbols which are affixed to large objects are generally located far from the housing and, concomitantly, HI-D symbols which are affixed to smaller objects are generally located closer to the housing. In such event, optical assembly 20 can form beam L1 with a large beam spot, e.g. on the order of 40 mils, at a far distance, e.g. 6', and optical assembly 22 can form beam L2 with a small beam spot, e.g. on the order of 6 mils, at a close distance, e.g. 3½" relative to the housing. This latter system has the best of both worlds in that the optical system 20 can read far-out LO-D symbols with accuracy and, at the same time, the same system can read close-in HI-D symbols, all without sacrificing reading accuracies or being disadvantaged with short working distances.

As noted above, the beam splitter 18 need not divide the beam issuing from the laser source 16 in equal amounts, and can be used to obtain at least some measure of power equalization. Thus, it is known that the laser light reflected off the symbol is detected by photosensor means operative for generating an electrical signal proportional to the magnitude of the reflected light. The electrical signal is thereupon processed by electronic circuitry to obtain data descriptive of the symbol. The closer the symbol is to the photosensor means, the higher the magnitude of the reflected laser light, and the larger the amplitude of the electrical signal generated by the photosensor means and presented to the electronic processing circuitry. In certain cases, the amplitude variation of said electrical signal can vary as much as 1000:1 (60 dB) between close-in and far-out symbols. Hence, it would be desirable to increase the electrical signal amplitude associated with far-out symbols and/or decrease the electrical signal amplitude of close-in symbols and, for that purpose, the beam splitter can be designed to send more than 50% of the beam issuing from the laser source 16 to the optical assembly responsible for reading far-out symbols. Thus, because the system needs more power to detect far-out symbols, the optical coatings on the beam splitter can be so designed as to direct more than 50%, e.g. 75%, of the light entering the splitter to the optical assembly 20 responsible for reading far-out symbols. The remaining 25% of the laser beam, of course, is directed to the other optical assembly because all that power is simply not needed for reading close-in symbols.

As discussed above, fine beam spots of generally circular cross-section are most suitable for reading HI-D symbols, whereas, large circular beam spots are most suitable for reading LO-D symbols. Since a single optical assembly will focus a gas laser beam to a circular beam spot of a certain diameter within a certain depth of field, the single optical assembly of the prior art cannot simultaneously satisfy the requirement to read HI-D and LO-D symbols with a single instrument. The invention, as shown by optical arrangement 40 of FIGS. 2-5, proposes to satisfy this requirement by making use of a non-circular beam spot having a longer and a shorter waist dimension in two mutually perpendicular directions. When a symbol is being scanned in a linear sweep over its length along a scanning direction by a beam spot, it is the waist dimension of the beam spot, as considered along the scanning direction, which determines whether the beam spot is to be considered fine or large, which, in turn, determines whether the spot will successfully read the particular density of the symbol being scanned. Hence, in the case of a non-circular beam spot, which can be elliptical, rectangular, oval or the like, in cross-section, the optical arrangement 40 proposes to orient the longer waist dimension along the scanning direction to read LO-D symbols, and to orient the shorter waist dimension along the scanning direction to read HI-D symbols. Since it may not be known whether the next symbol to be read is of low density or high density, the arrangement 40, in an advantageous embodiment, alternately orients the longer, and then the shorter, waist dimension along the scanning direction. Preferably, this alternate orientation will occur during each scan and, more preferably, more than once during each scan. At the same time, as explained below, the optical arrangement 40 changes the predetermined working distance at least more than once during each scan.

Figure 2:
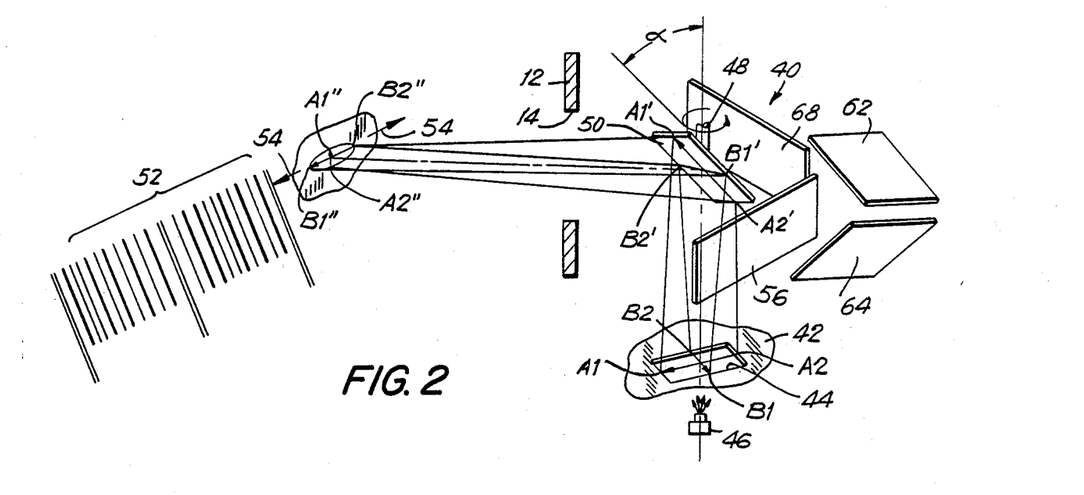
FIG. 2 is a diagrammatic view of another optical system operative for changing the reading range and/or for turning the reading spot during one stage of scanning in a laser scanning system in accordance with this invention.

In order to obtain a non-circular spot, the diffraction optics theory of spot formation can be utilized, wherein a diaphragm 42 having a non-circular aperture or exit pupil 44 can be positioned in the path of a laser beam having a circular cross-section, i.e. a gas laser tube. According to diffraction theory, the spot size is proportional to the focal number of the optical system, which, in turn, equals the ratio of the image distance (Z) of the spot to the size of the pupil 44. Hence, the larger the open dimension of the pupil 44, the smaller the waist dimension of the beam spot at the focal plane, and vice versa. Thus, by varying the dimensions of the pupil 44, the degree of non-circularity of the beam spot can be controlled.

Another way of obtaining a non-circular spot is to make use of the diffraction property of the laser diode 46 itself which has different sizes of emitting area in two mutually perpendicular directions, as a result of which, the focused beam spot already has a non-circular cross-section without having to use a non-circular exit pupil on an external diaphragm. Nevertheless, to obtain more precise control over the non-circularity of the laser diode beam, it is recommended that an external diaphragm having a non-circular exit pupil be mounted in the path of the laser diode beam.

In order to orient the non-circular beam with either its longer or its shorter waist dimension along the scanning direction, the diaphragm 42 can be rotated, and/or a rotary mirror 50, as shown in FIGS. 2-5, can be located in the optical path of the non-circular beam and rotated. The mirror 50 is mounted at a tilt angle α on a vertical shaft 48 for joint rotation therewith about the vertical axis along which the shaft 48 extends. Preferably, the tilt angle is on the order of 45°.

As shown in an initial stage illustrated in FIG. 2, the laser diode beam emitted from diode 46 passes through exit pupil 44 having longer dimension A1-A2 and shorter dimension B1-B2 and, thereupon, impinges upon rotary mirror 50 with a cross-sectional beam spot thereon having dimensions A1'-A2' and B1'-B2', respectively. The beam is then reflected forwardly through the exit port 14 on housing 12 to impinge on a LO-D symbol 52 located exteriorly of the housing. The beam spot focused on symbol 52 has a longer waist dimension B1''-B2'' along the scanning direction, as indicated by arrows 54, and a shorter waist dimension A1''-A2''. In this initial stage, the longer waist dimension is oriented along the scanning direction so that the beam has an "effective" larger spot size adapted to read LO-D symbols.

Figure 3:
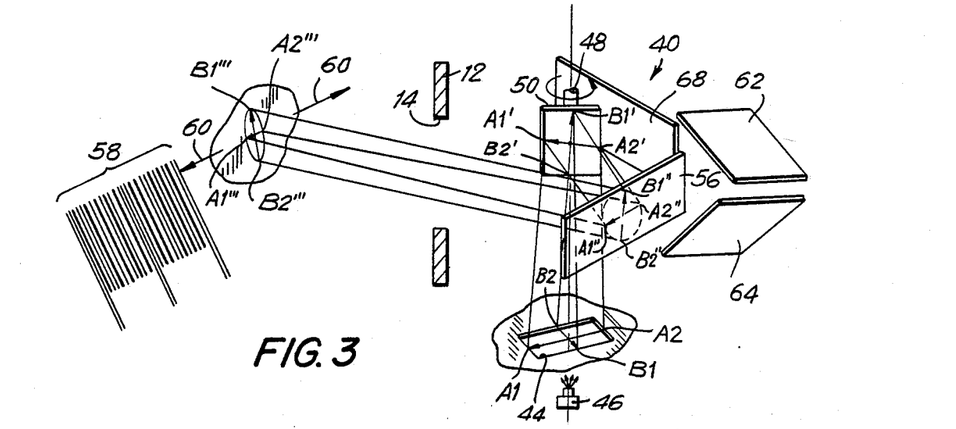
FIG. 3 is a view analogous to FIG. 2, but at another stage of scanning.

As shown in a partially rotated stage illustrated in FIG. 3, the mirror 50 has been rotated 90° about the vertical axis as compared to the initial stage of FIG. 2. As before, the laser diode beam impinges on mirror 50 with a cross-sectional spot having dimensions A1'-A2' and B1'-B2'. The beam is then reflected off to one side to inclined side mirror 56 which is oriented to reflect the beam forwardly through the exit port 14. The beam on side mirror 56 has dimensions A1''-A2'' and B1''-B2'', and the resulting beam spot focused on a HI-D symbol 58 has a longer waist dimension B1'''-B2''' and a shorter waist dimension A1'''-A2''', the latter being oriented along the scanning direction, as indicated by arrows 60. In this 90° rotated stage, the beam has an "effective" fine spot size more suited to read HI-D symbols.

Figure 4:
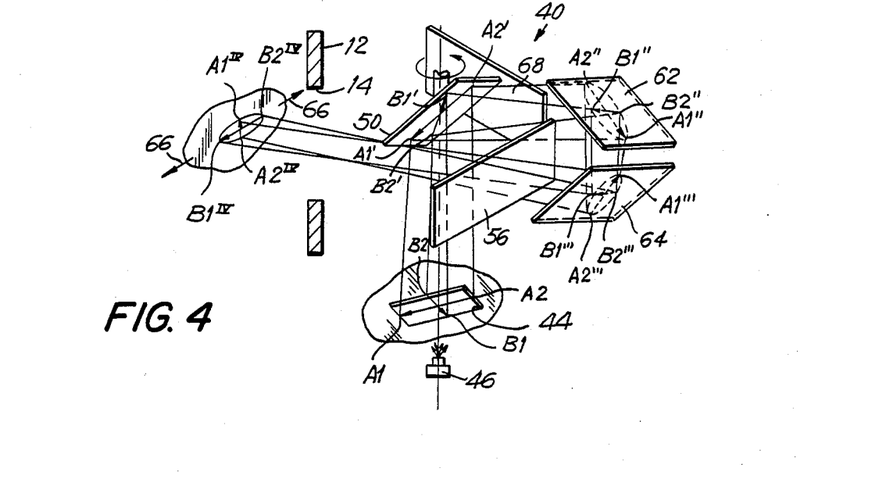
FIG. 4 is a view analogous to FIG. 3, but at still another stage of scanning.

As shown in a further rotated stage, illustrated in FIG. 4, the mirror 50 has been rotated 180° about the vertical axis relative to the aforementioned initial stage. The laser beam passing through pupil 44 impinges on mirror 50 with a cross-sectional spot having dimensions A1'-A2' and B1'-B2'. Thereupon, the laser beam is reflected rearwardly to inclined top mirror 62 where the beam spot has dimensions A1''-A2'' and B1''-B2''. The top mirror 62 reflects the laser beam downwardly toward inclined bottom mirror 64 upon which the laser beam has dimensions A1'''-A2''' and B1'''-B2'''. The bottom mirror is arranged to forwardly reflect the beam through the exit port 14 of the housing to impinge on a non-illustrated LO-D symbol analogous to symbol 52. The beam spot focused on such symbol has a longer waist dimension $B1^{IV}-B2^{IV}$ along the scanning direction, as indicated by arrows 66, and a shorter waist dimension $A1^{IV}-A2^{IV}$. In this further rotated stage, the longer waist dimension $B1^{IV}-B2^{IV}$ is more suited to read LO-D symbols.

A further 90° rotation of the rotary mirror 50 from the stage illustrated in FIG. 4 has not been separately illustrated, but is completely analogous to the stage shown in FIG. 3, except that the beam reflected off mirror 50 is not reflected toward inclined side mirror 56, but, instead, is reflected to inclined side mirror 68. As before, the laser beam reflected off side mirror 68 is directed forwardly through the exit port 14 and results in a focused beam spot at the symbol whose shorter waist dimension is oriented along the scanning direction for the purpose of reading HI-D symbols.

Figure 5:
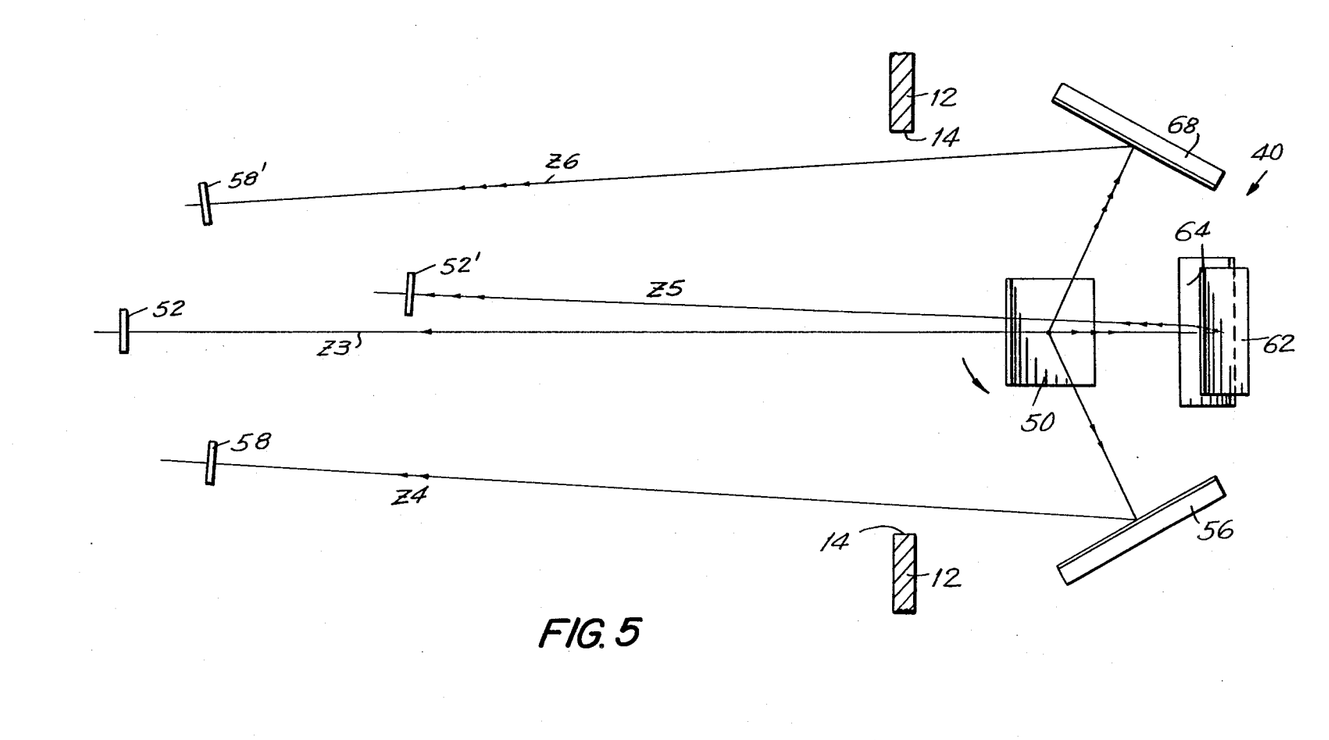
FIG. 5 is a top plan view of the optical system of FIGS. 2-4.

Turning now to FIG. 5, the optical arrangement 40 is shown in top plan view. Quite apart from the turning of the laser beam to read HI-D or LO-D symbols during each rotation of the rotary mirror 50, the arrangement also simultaneously focuses the beam spot at different distances from the housing and, thus, performs a zooming function. The outgoing beam which is reflected forwardly solely by mirror 50 in the initial stage of FIG. 2 extends along a path denoted by a single-headed arrow, and is focused on LO-D symbol 52 located at a far-out distance Z3 from the housing. The outgoing beam which is reflected forwardly by mirror 50 and side mirror 56 extends along a path denoted by twin-headed arrows, and is focused on HI-D symbol 58 at an intermediate distance Z4 from the housing. The outgoing beam which is reflected forwardly by mirror 50, top mirror 62 and bottom mirror 64 extends along a path denoted by triple-headed arrows, and is focused on a LO-D symbol 52' at a close-in distance Z5 from the housing. The outgoing beam which is reflected forwardly by mirror 50 and side mirror 68 extends along a path denoted by quadruple-headed arrows, and is focused on a HI-D symbol 58' located at an intermediate distance Z6 from the housing. It will be appreciated that the total length of the various optical paths from the mirror to the focal plane at which the focused beam spot intercepts the symbol is the same in all cases. The different distances of the focal plane relative to the housing is due to the diversion of the beam to either side mirror 56 or 58, or to both top and bottom mirrors 62, 64. Hence, during each rotation of mirror 50, four sweeps of the symbol are performed: a far-out and a close-in sweep of LO-D symbols, and two intermediate range sweeps of HI-D symbols. Other variations are, of course, possible.

Figure 6A:
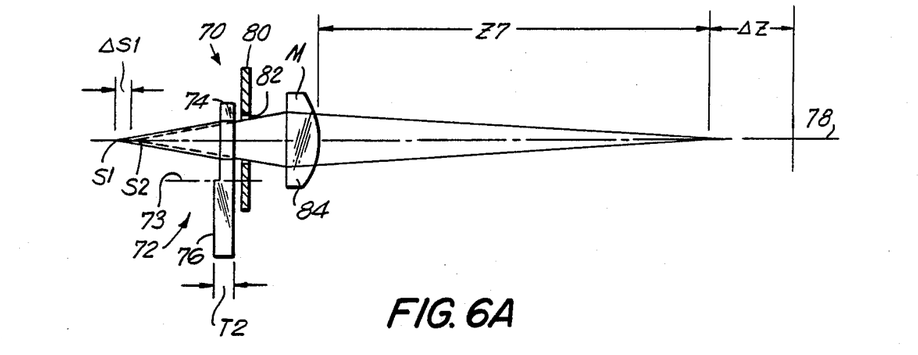
FIG. 6A is a diagrammatic view of still another optical system operative for changing the reading range and/or the reading spot size during one stage of scanning in a laser scanning system in accordance with this invention.
Figure 6B:
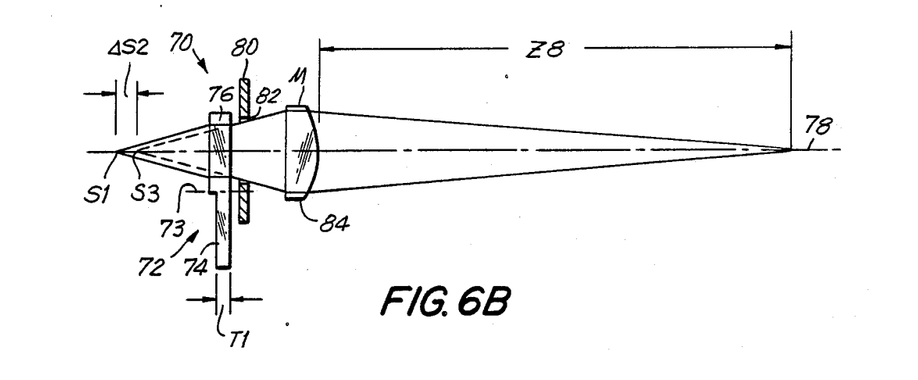
FIG. 6B is a view analogous to FIG. 6A, but at another stage of scanning.

Turning now to FIGS. 6A and 6B, optical arrangement 70 is operative for adjusting the working distance between distances Z7 and Z8 and/or for adjusting the waist dimension of the beam spot along the scanning direction. A laser source is positioned at site S1. A light-transmissive rotary plate 72 has a first plate portion 74 of small thickness T1, and a second plate portion 76 of larger thickness T2. Plate 72 is rotatable about axis 73 which is offset from and parallel to optical axis 78. Each plate portion is preferably made of glass and has a different optical distance characteristic which is the product of the respective index of refraction (n) and the thickness of the respective plate portion. Either plate portion 74 or 76 is located downstream of the source. A diaphragm 80 having a vertical stop or entrance pupil 82 is located downstream of plate 72. A focusing lens 84 having a high magnification factor M on the order of twenty or twenty-five is located downstream of diaphragm 80.

It can be shown that the value of the thickness dimension T1 of the plate portion 74 will cause an apparent shift Δ S1 in the position S1 of the source to position S2 in FIG. 6A, and also that the value of the thickness dimension T2 of plate portion 76 will cause an apparent shift Δ S2 in the position S1 of the source to position S3 in FIG. 6B. It can further be shown that the shift in the actual and apparent positions of the source, when multiplied by the square of the magnification factor, is proportional to the shift in the focal plane positions of the focused beam spot, i.e. from Z7 to Z8. Hence, due to the high magnification factor, a relatively small shift in the actual and apparent positions of the source can cause a very large and major shift in the position of the focused beam spot. By way of numerical example, assume that the index of refraction of the glass plate 72 is 1.6, and that the source is located 7 mm away from the upstream side of the plate 72, then the following position shifts are obtained:

TABLE I

| Thickness (T) | Source Shift (ΔS) | Magnification Factor (M) | Beam Spot Shift (ΔZ) |
|---|---|---|---|
| 0.25 mm | 0.1 mm | 20 | 40 mm |
|  |  | 25 | 62.5 mm |
| 0.50 mm | 0.2 mm | 20 | 80 mm |
|  |  | 25 | 125 mm |
| 0.75 mm | 0.288 mm | 20 | 115.2 mm |
|  |  | 25 | 180.0 mm |

Hence, by positioning, e.g. by rotating, either plate portion 72 or 74 in the optical path, the laser beam can be focused at two different distances Z7 or Z8 which are spaced relatively far apart. By incorporating the optical arrangement 70 in a scanner housing, symbols can be scanned over an increased range. Of course, the plate 72 need not be limited to having two plate portions of different optical distance characteristics, different indices of refraction, or different thicknesses, but equally can be provided with multiple plate thicknesses for generating multiple beam spot shifts.

It can also be shown that by making the entrance pupil 82 smaller, the divergence of the laser beam increases, and the spot size on the focal plane is larger. Conversely, by making the entrance pupil 82 larger, the focused spot size is smaller. Hence, by opening or closing the size of the entrance pupil, the waist dimension of the focused beam spot, particularly along the scanning direction, can be controlled, either in a digital or analogue manner.

Figure 7:
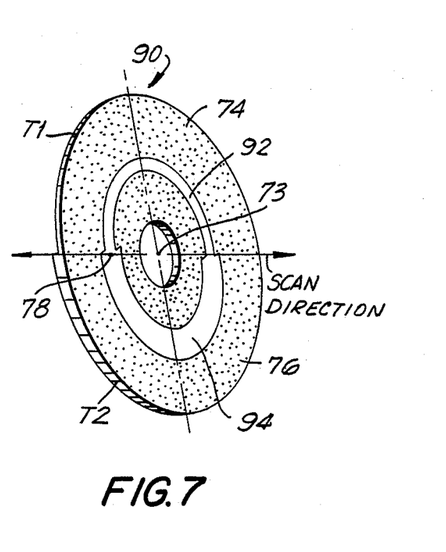
FIG. 7 is a perspective view of an optical component for use in the system of FIGS. 6A, 6B.

FIG. 7 illustrates a one-piece disc-like component 90 which conveniently combines the functions of the glass plate 72 and the diaphragm entrance pupil 82. Component 90 is mounted between focusing lens 84 and the laser source, and has a circular shape. The upper half of component 90 corresponds to plate portion 74, and has a relatively thin thickness T1. The lower half of component 90 corresponds to plate portion 76, and has a relatively thick thickness T2. The downstream surface of component 90 is coated with an opaque coating, shown by stippling, which blocks the passage of light therethrough, except through small semi-circular pupil region 92 and large semi-circular pupil region 94, the pupil regions being small or large as considered along the scan direction. When laser light passes through pupil region 92, a large spot size is created on the focal plane. When laser light passes through pupil region 94, a fine spot size is created on the focal plane.

In operation, when component 90 is rotated about axis 73, the small and large pupil regions 92, 94 take turns being situated in front of the laser beam. At the same time, the thin and thick portions of the component 90 take turns being situated in front of the laser beam. When the thin plate portion 74 and the small pupil region 92 are together positioned along the optical light path, then a beam spot having a relatively large spot size and located at a distance close-in to the housing is generated. When the thicker plate portion 76 and the larger pupil region 94 are situated along the optical path, then a beam spot having a relatively small spot size and located at a distance further out from the housing is generated. Further half-turning of the component 90 causes the outgoing beam to be moved between positions Z7 and Z8 and, concomitantly, the beam spot is changed in size.

Other variations are, of course, within the spirit of this invention. For example, the small pupil region 92 could be located on thicker plate portion 76, and large pupil region 94 could be located on thinner plate portion 74.

Figure 8:
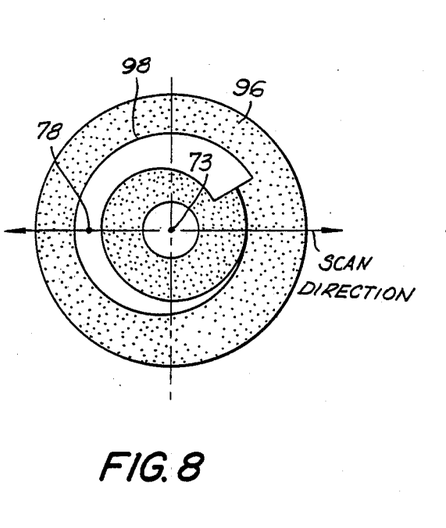
FIG. 8 is a perspective view of another optical component for use in the system of FIGS. 6A, 6B.

FIG. 8 shows an optical disc-like component 96 analogous to component 90 of FIG. 7, except that, rather than providing two disc pupil openings, a single pupil opening 98 of continuously changing size is formed. The scan direction is horizontal in FIG. 8. The opening 98 tapers along the scan direction from a large size to a small size. When rotated, the opening 98 causes the resulting beam spot size to be continuously variable on the focal plane. Assuming that the scanning component 96 rotates very fast, e.g. on the order of forty revolutions per second, then for each revolution of the component 96, at least one scan across the bar code symbol will have the optimum beam waist.

It should further be noted that more laser output power will be transmitted through a larger pupil opening, and vice versa. Since more power will be transmitted through larger pupil opening 94, as compared to the power transmitted through smaller pupil opening 92, this power difference can be used to achieve at least a limited measure of power equalization, wherein more power is transmitted to far-out symbols, and less power is transmitted to close-in symbols.

It is known that, under some circumstances, the actual waist position of a focused Gaussian laser beam will be closer to the focusing lens than the image position given by conventional geometric optics. It has been found that not only Gaussian beams, but also any beam, can exhibit so-called focal shift if the Fresnel number which describes the beam over the exit aperture of the focusing lens is on the order of unity or smaller.

The Fresnel number (N) is defined as:

$$N = \frac{a^2}{\lambda R}$$

wherein:
a is the radius of the exit aperture of the focusing lens;
λ is the wavelength of the laser beam; and
R is the distance between the image position and the focusing lens.

Hence, in order to obtain the aforementioned focal plane shift using laser diode beam aperturing, i.e. by changing "a" in the Fresnel number equation, the various parameters of the system must be chosen so that the Fresnel number will be close to unity. Thus, the laser diode beam has a wavelength λ=780 mm; the aperture radius a is selected to be variable about 0.5 mm; and the focusing distance R is selected to be about 300 mm. With such parameter values, the Fresnel number N=1.07 at the exit aperture of the focusing lens.

Since, in the above numerical example, the Fresnel number is close to unity, the variation of the aperture radius of the focusing lens, e.g. lens 84, can therefore be used as the basis for a zooming system. For example, in the case where the aperture radius is changed from 0.3 mm to 0.8 mm, the focused beam spot is shifted from about 90 mm to about 270 mm. The change in the aperture radius of the focusing lens can be achieved, e.g. by positioning the diaphragm 80 having pupil 82 of varying width either directly in front or in back of the focusing lens 84, and preferably in close proximity therewith in order to convert the pupil 82 to the aforementioned exit aperture having radius "a". Either optical component 90 or 98 in FIGS. 7 and 8 can advantageously be employed to change the aperture radius of a focusing lens and, in turn, to shift the predetermined distance at which the laser beam is focused at the focal plane.

Figure 9:
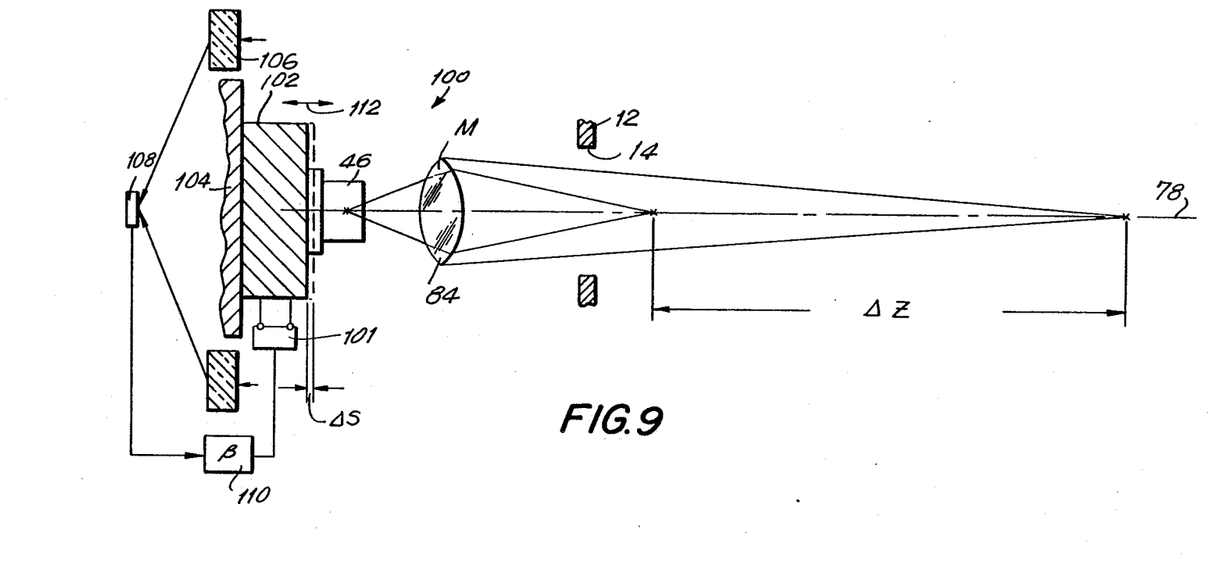
FIG. 9 is a diagrammatic view of yet another system operative for changing the reading range during scanning in a laser scanning system in accordance with this invention.

Optical arrangement 100 in FIG. 9 is also operative for changing the predetermined working distance, but in this embodiment, this function is achieved by moving the laser source itself. As stated previously, a shift $\Delta S$ in the position of a source, when multiplied by the square of the magnification factor M of a focusing lens, equals a corresponding shift $\Delta Z$ in the working distance. If the magnification factor is high enough, then a relatively small shift in the position of the laser source will result in a major shift in the working distance.

Thus, in FIG. 9, the magnification factor or focusing lens 84 is assumed to be on the order of 100. Also, since it is the source which is to be moved, practical and energy considerations dictate that it would be more efficient to move a compact laser diode 46 rather than the very bulky gas laser tube. Hence, diode 46 is mounted on a voltage-to-position transducer, e.g. a unimorph substrate 102. Transducer 102 is electrically connected to a unimorph drive 101 which is connected to an AC electrical supply. The drive 101 reciprocally drives the transducer 102 back and forth in the direction of arrows 112. Transducer 102 is mounted on a stationary support 104 in the housing 14.

When the drive 101 applies an alternating voltage to the transducer 102, the transducer is moved along the optical axis 78, and the diode 46 participates in this movement. Due to the high magnification factor of lens 84, the working distance shift $\Delta Z$ is $M^2$ times larger than the source position shift $\Delta S$.

The optical arrangement 100 is mounted within housing 12 having exit port 14 through which outgoing laser beam is directed to a symbol. The laser beam reflected off the symbol is detected by photosensors mounted in the housing. In the FIG. 9 embodiment, it is advantageous if a Fresnel condenser lens 106 surrounds the diode-transducer sub-assembly. The condenser lens 106 collects the reflected light and focuses the latter on photosensor 108 which is operative to convert the collected light to an electrical signal which, in turn, is processed by electronic circuitry to data descriptive of the symbol. The electrical symbol generated by the photosensor 108 could simultaneously be supplied to an open-loop or a closed-loop feedback circuit 110 which is electrically connected to the transducer drive 101. The feedback circuit generates a feedback signal $\beta$ which controls the drive 101 and moves the diode 46 to the optimum position required for reading the symbol, wherever it may be located within the zoom range of the system.

Figure 10:
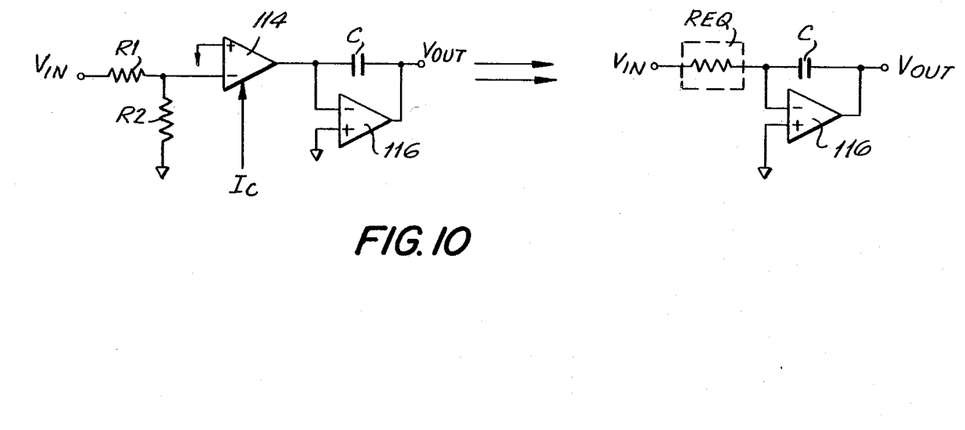
FIG. 10 is a schematic of an electrical circuit operative for effectively changing the reading spot size during scanning in a laser scanning system in accordance with this invention.

Before considering FIG. 10, it must be recognized that the overall performance of a scanning system for reading symbols is a function not only of the optical, but also of the electronic, sub-system. The optical subsystem will focus the beam to have a certain measurable spot size, but the electronic sub-system, and particularly the analogue signal processing circuitry, also has a role to play in contributing to the detection and spot size. The concept of effective spot size was introduced by Mr. Eric Barkan and Dr. Jerome Swartz in the following two articles:

"Advances in Laser Scanning Technology", Proceedings of The International Society For Optical Engineering, Volume 299, Aug. 27-28, 1981.

"SYSTEM DESIGN CONSIDERATIONS IN BAR-CODE LASER SCANNING", Optical Engineering, Volume 23, No. 4, Pages 413-420, July/August, 1981.

The concept of effective spot size was defined by the following equation:

$$w_{eff} = \sqrt{w_{opt}^2 + w_{el}^2}$$

wherein:
$w_{opt}$ is the spot size of the focused beam at the focal plane due solely to the optical system; and
$w_{el}$ is the addition to the spot size caused by the electrical system.

The $w_{el}$ parameter is a function of the frequency bandwidth or the time constant of the analog system processing circuitry, as well as a function of the laser beam spot velocity at the focal or scanning plane.

Now, as noted previously, it is an object of this invention to increase the working distance at which symbols can be read. However, with increasing distance from the housing, the contribution of $w_{el}$ results in an increase in the value of $w_{eff}$, thereby degrading overall system performance at such far-out distances. At too long a far-out distance, the symbol can no longer be read. Hence, to compensate for the increasing contribution caused by the electronic circuitry with increasing distance of the symbol relative to the housing, this invention proposes decreasing the time constant of the electronic circuitry with increasing symbol distances. This decreasing the time constant will compensate for concomitant spot speed velocity increases so that $w_{el}$ will be kept more or less constant over an increased working distance.

As shown on the left side of FIG. 10, an operational transconductance amplifier 114 having a very high output impedance is connected upstream of the analog electronic processing circuitry. The positive input of amplifier 114 is connected to ground. A resistive R1-R2 network is connected to the negative input of amplifier 114. The amplifier output is connected through a capacitor C to the analog electronic circuitry. An amplifier 116 has its negative input and output connected across capacitor C. The positive input of amplifier 116 is grounded. A control current $I_c$ is supplied to a gate of amplifier 114, and varies the gain thereof.

A simplified equivalent circuit to the one just described is shown on the right side of FIG. 10. The time constant of the equivalent circuit is proportional to $R_{eq}$ and C. The time constant depends on the input voltage $V_{in}$ and the output current of the transconductance amplifier.

In order to provide power equalization for far-out and close-in symbols, the output current should be maintained constant. This can be achieved by a corresponding change in the magnitude of the control current $I_c$. Assuming such constant output current, then $R_{eq}$ which is equal to is determined only by the input voltage. Since the input voltage decreases with an increase in the distance between the scanner housing and the symbol, a decrease in the time constant is achieved because of the corresponding decrease in the value of $R_{eq}$.

Therefore, the circuitry of FIG. 10 provides not only gain control and power equalization, but also simultaneously changes the time constant of the electronic circuitry in such a way as to compensate for spot speed increase with increase of the working distance. Depending upon the relationship between spot speed and signal amplitude, $w_{el}$ can be made independent of the working distance, or at least the contribution of $w_{el}$ can be less and less noticeable with an increase of the working distance.

The transconductance amplifier 114 may advantageously be integrated circuit chip Model No. CA 3080 made by RCA Corp.

It will be understood that each of the elements described above, or two or more together, also may find a useful application in other types of constructions differing from the types described above.

While the invention has been illustrated and described as embodied in a bar code symbol reader with variable spot size and/or working distance, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a laser scanning system for reading symbols, a combination comprising:
   (a) a housing having an exit port;
   (b) laser means in the housing for generating a laser beam;
   (c) scanning means in the housing for scanning the laser beam in scans across successive symbols located exteriorly of the housing; and
   (d) optical means in the housing for directing the scanning beam along an optical path through the exit port, and for optically forming the scanning beam with a cross-sectional beam spot of a predetermined waist size and at a predetermined distance from the exit port of the housing,
   said optical means including means for changing the predetermined waist size of the beam spot during scanning.

2. The combination as recited in claim 1, wherein the optical means includes a first optical subassembly for directing the scanning beam through the exit port during a part of each scan, and for optically forming the scanning beam with a cross-sectional beam spot of a predetermined first waist size and at a predetermined first distance from the exit port of the housing; and wherein the changing means includes a second optical subassembly for directing the scanning beam through the exit port during another part of each scan, and for optically forming the scanning beam with a cross-sectional beam spot of a predetermined second waist size and at a predetermined second distance from the exit port of the housing.

3. The combination as recited in claim 2, wherein the first and the second optical subassemblies form their respective beam spots of the same predetermined waist size but at different predetermined distances to increase the range at which -symbols of the same predetermined density can be read.

4. The combination as recited in claim 2, wherein the first and the second optical subassemblies form their respective beam spots of different predetermined waist sizes and at different predetermined distances to enable symbols of one density to be read at close range and symbols of another density to be read at far range.

5. The combination as recited in claim 2, wherein the first and the second optical subassemblies form their respective beam spots at different predetermined distances, and include means for transmitting a first fractional magnitude of the scanning beam through the first optical subassembly, and a second fractional magnitude of the scanning beam through the second optical subassembly.

6. The combination as recited in claim 5, wherein the transmitting means is operative to transmit the scanning beam through the first optical subassembly with a lower fractional magnitude to enable symbols at close range to be read, and through the second optical subassembly with a higher fractional magnitude to enable symbols at far range to be read.

7. The combination as recited in claim 1, wherein the optical means includes focusing means having a high magnification factor, an entrance pupil, and a light-transmissive plate having plate portions of different optical distance characteristics; and wherein the changing means is operative for moving the plate between a close position in which one plate portion is positioned adjacent the entrance pupil to enable close-in symbols to be read, and a far position in which another plate portion is positioned adjacent the entrance pupil to enable far-out symbols to be read.

8. The combination as recited in claim 1, wherein the changing means includes means for changing the predetermined distance of the beam spot simultaneously with the changing of the predetermined waist size.

9. The combination as recited in claim 8, wherein the optical means includes focusing means having a high magnification factor, a light-transmissive plate, and an entrance pupil having differently-sized openings as considered along the scanning direction; and wherein the changing means is operative for moving the entrance pupil between a low density position in which one pupil opening is positioned adjacent the plate to enable low density symbols to be read, and a high density position in which another pupil opening is positioned adjacent the plate to enable high density symbols to be read.

10. The combination as recited in claim 8, wherein the optical means includes focusing means having a high magnification factor, and an optical element having light-transmissive plate portions of different optical distance characteristics and a light-blocking coating on the element, said coating bounding an entrance pupil having differently-sized openings as considered along the scanning direction; and wherein the changing means is operative for moving the element between a low density position in which one plate portion and one pupil opening are simultaneously positioned adjacent the focusing means to form a larger spot waist size at a further distance from the exit port to read low density symbols at far range, and a high density position in which another plate portion and another pupil opening are simultaneously positioned adjacent the focusing means to form a smaller spot waist size at a closer distance from the exit port to read high density symbols at close range.

11. The combination as recited in claim 10, wherein the element is mounted on the housing for turning movement, and wherein the entrance pupil has two pupil openings sequentially arranged in the turning direction, said pupil openings being operative for respectively forming beam spots of two different waist sizes.

12. The combination as recited in claim 10, wherein the element is mounted on the housing for turning movement, and wherein the entrance pupil has a single pupil opening of gradually changing size as considered in the turning direction, said pupil opening being operative for forming beam spots of gradually changing waist sizes.

13. The combination as recited in claim 1, wherein the changing means includes means for reciprocally moving the laser means relative to the housing upstream and downstream of the optical path.

14. The combination as recited in claim 13, wherein the laser means is a compact semiconductor diode, and wherein the moving means includes an electrically-controlled position transducer on which the diode is mounted, and wherein the optical means includes a focusing means of high magnification factor.

15. The combination as recited in claim 8; and further comprising electrical circuit means for sensing light of variable intensity reflected from the symbols, and for processing the sensed light into data descriptive of the symbols; and wherein the means for changing the predetermined waist size of the beam spot includes means for changing the electrical characteristics of the electrical circuit means.

16. In a laser scanning system for reading symbols of different densities, a combination comprising:
(a) a housing having an exit port;
(b) laser means in the housing for generating a laser beam;
(c) scanning means in the housing for scanning the laser beam in linear scans extending in scanning directions across successive symbols located exteriorly of the housing;
(d) optical means for directing the scanning beam along an optical path through the exit port, and for optically forming the scanning beam with a non-circular cross-sectional beam spot having a longer and a shorter waist dimension in two mutually perpendicular directions and at a predetermined distance from the exit port; and
(e) means in the housing for turning the scanning beam between a low density orientation in which the longer waist dimension of the spot extends along the scanning direction for reading low density symbols, and a high density orientation in which the shorter waist dimension of the spot extends along the scanning direction for reading high density symbols.

17. The combination as recited in claim 16, wherein the optical means includes a diaphragm having an aperture with a longer and a shorter opening in two mutually perpendicular directions, and arranged in the optical path of the scanning beam.

18. The combination as recited in claim 17, wherein the diaphragm is mounted in the housing for turning movement relative thereto between low density and high density positions corresponding to the low density and high density orientations of the scanning beam.

19. The combination as recited in claim 17, wherein the diaphragm is stationarily mounted in the housing, and the turning means includes a pair of light-reflecting mirrors, one of which is mounted in the housing for turning movement relative thereto between low density and high density positions corresponding to the low density and high density orientations of the scanning beam.

20. The combination as recited in claim 16, wherein the optical means includes means for changing the predetermined distance of the beam spot during scanning.

21. The combination as recited in claim 20, wherein the optical means forms the beam spot with the longer dimension oriented in the low density orientation at a far-out distance relative to the exit port during one scan, and forms the beam spot with the shorter dimension oriented in the high density orientation at a close-in distance relative to the exit port during another scan.

22. The combination as recited in claim 21, wherein the optical means includes light-reflecting folding mirrors arranged for directing the scanning beam along shorter and longer paths during different scans.

* * * * *